(12) United States Patent
Gao et al.

(10) Patent No.: US 11,596,002 B2
(45) Date of Patent: Feb. 28, 2023

(54) METHOD, DEVICE, APPARATUS FOR SELECTING A RANDOM ACCESS RESOURCE, AND STORAGE MEDIUM

(71) Applicant: ZTE Corporation, Shenzhen (CN)

(72) Inventors: Minggang Gao, Shenzhen (CN); Qingyu Ni, Shenzhen (CN); Yajing Wang, Shenzhen (CN); Xuemei Ding, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 203 days.

(21) Appl. No.: 17/054,481

(22) PCT Filed: May 10, 2019

(86) PCT No.: PCT/CN2019/086429
§ 371 (c)(1),
(2) Date: Nov. 10, 2020

(87) PCT Pub. No.: WO2019/214718
PCT Pub. Date: Nov. 14, 2019

(65) Prior Publication Data
US 2021/0195646 A1    Jun. 24, 2021

(30) Foreign Application Priority Data

May 11, 2018 (CN) .......................... 201810449441.8

(51) Int. Cl.
*H04W 74/08* (2009.01)
*H04B 17/318* (2015.01)
(Continued)

(52) U.S. Cl.
CPC ...... *H04W 74/0833* (2013.01); *H04B 17/318* (2015.01); *H04B 17/336* (2015.01);
(Continued)

(58) Field of Classification Search
CPC .............. H04W 74/0833; H04W 24/10; H04B 17/318; H04B 17/336
See application file for complete search history.

(56) References Cited

U.S. PATENT DOCUMENTS

2020/0015097 A1* 1/2020 Kazmi ................. H04B 17/336
2020/0314910 A1* 10/2020 Höglund ............... H04W 48/10
2021/0337474 A1* 10/2021 Åström ............ H04W 52/0251

FOREIGN PATENT DOCUMENTS

CN     104254135 A     12/2014
CN     104704884 A      6/2015
(Continued)

*Primary Examiner* — Walli Z Butt
*Assistant Examiner* — Ryan C Kavleski
(74) *Attorney, Agent, or Firm* — Vivacqua Crane, PLLC

(57) ABSTRACT

A method, device, apparatus for selecting a random access resource, and storage medium. The method includes: measuring an RSRP value, an RSRQ value and a PL value of a downlink channel; calculating a fluctuation value of RSRP, RSRQ and PL, according to the measured RSRP value, the RSRQ value, the PL value and an RSRP value, an RSRQ value, a PL value in a first configuration table; comparing each of the fluctuation value of RSRP, RSRQ and PL with a respective corresponding preset threshold; and in response to each of the fluctuation value not exceeding the respective corresponding preset threshold, selecting a first CEL in a second configuration table according to the RSRP value, the RSRQ value and the PL value in the first configuration table, and determining a first random access resource according to the selected first CEL.

13 Claims, 5 Drawing Sheets

(51) Int. Cl.
*H04B 17/336* (2015.01)
*H04W 24/10* (2009.01)
*H04W 72/02* (2009.01)
*H04W 72/08* (2009.01)

(52) U.S. Cl.
CPC ........... *H04W 24/10* (2013.01); *H04W 72/02* (2013.01); *H04W 72/085* (2013.01)

(56) References Cited

FOREIGN PATENT DOCUMENTS

| CN | 104812084 A | 7/2015 | |
|---|---|---|---|
| WO | 2017065468 A1 | 4/2017 | |
| WO | 2017078090 A1 | 5/2017 | |
| WO | WO-2019138378 A1 * | 7/2019 | ............. H04B 17/24 |

* cited by examiner

METHOD, DEVICE, APPARATUS FOR SELECTING A RANDOM ACCESS RESOURCE, AND STORAGE MEDIUM

CROSS-REFERENCE TO RELATED APPLICATIONS

This application is a national stage filing under 35 U.S.C. § 371 of international application number PCT/CN2019/086429, filed May 10, 2019, which claims priority to Chinese patent application No. 201810449441.8, filed May 11, 2018. The contents of these applications are incorporated herein by reference in their entirety.

TECHNICAL FIELD

The present disclosure relates to, but not limited to, the technical field of communication.

BACKGROUND

With the widespread use of Internet of Things (IoT) applications and IoT terminal equipment, it is necessary to provide a wireless network technology suitable for IoT communication. The 3rd generation partnership project (3GPP) studies a new access system, which is configured to provide a low complexity and low throughput wireless access technology to meet the needs of wireless IoT, known as narrow band IoT (NB-IoT). The characteristics of this access technology include supporting a large number of equipment with low throughput, low latency sensitivity, ultra-low hardware cost, ultra-low power consumption and optimized network architecture.

Due to the requirement of network communication in harsh environment, NB-IoT adopts different uplink power configuration and preamble resource parameter configuration according to the classification of downlink signal strength. Existing protocols only use a single reference signal receiving power (RSRP) for estimation, which has several problems, such as waste of channel resources, high probability of initial access failure and so on.

SUMMARY

According to an embodiment of the present disclosure, there is provided a method for selecting a random access resource, including: measuring a reference signal receiving power (RSRP) value, a reference signal receiving quality (RSRQ) value and a path loss (PL) value of a downlink channel; calculating a fluctuation value of RSRP, a fluctuation value of RSRQ and a fluctuation value of PL, according to the measured RSRP value, the measured RSRQ value, the measured PL value and an RSRP value, an RSRQ value, a PL value in a first configuration table; comparing each of the fluctuation value of RSRP, the fluctuation value of RSRQ and the fluctuation value of PL with a respective corresponding preset threshold; and in response to each of the fluctuation value of RSRP, the fluctuation value of RSRQ and the fluctuation value of PL not exceeding the respective corresponding preset threshold, selecting a first coverage enhancement level (CEL) in a second configuration table according to the RSRP value, the RSRQ value and the PL value in the first configuration table, and determining a first random access resource according to the selected first CEL.

According to another embodiment of the present disclosure, there is provided a device for selecting a random access resource, including: a measurement module configured to measure a reference signal receiving power (RSRP) value, a reference signal receiving quality (RSRQ) value and a path loss (PL) value of a downlink channel; a calculation module configured to calculate a fluctuation value of RSRP, a fluctuation value of RSRQ and a fluctuation value of PL, according to the measured RSRP value, the measured RSRQ value, the measured PL value and an RSRP value, an RSRQ value, a PL value in a first configuration table; a comparison module configured to compare each of the fluctuation value of RSRP, the fluctuation value of RSRQ and the fluctuation value of PL with a respective corresponding preset threshold; and a selection module configured to, in response to each of the fluctuation value of RSRP, the fluctuation value of RSRQ and the fluctuation value of PL not exceeding the respective corresponding preset threshold, select a first coverage enhancement level (CEL) in a second configuration table according to the RSRP value, the RSRQ value and the PL value in the first configuration table, and determine a first random access resource according to the selected first CEL.

According to yet another embodiment of the present disclosure, there is provided an apparatus for selecting a random access resource, including a memory and a processor, wherein a computer program is stored in the memory, when the computer program is executed by the processor, the processor performs the method for selecting a random access resource according to the present disclosure.

According to yet another embodiment of the present disclosure, there is provided a non-transitory computer-readable storage medium storing a computer program which, when executed by a processor, causes the processor to perform the method for selecting a random access resource according to the present disclosure.

BRIEF DESCRIPTION OF DRAWINGS

The realization of the purpose, functional features and advantages of the present disclosure will be further explained with reference to the drawings in combination with embodiments.

DETAILED DESCRIPTION

Figure 1A:
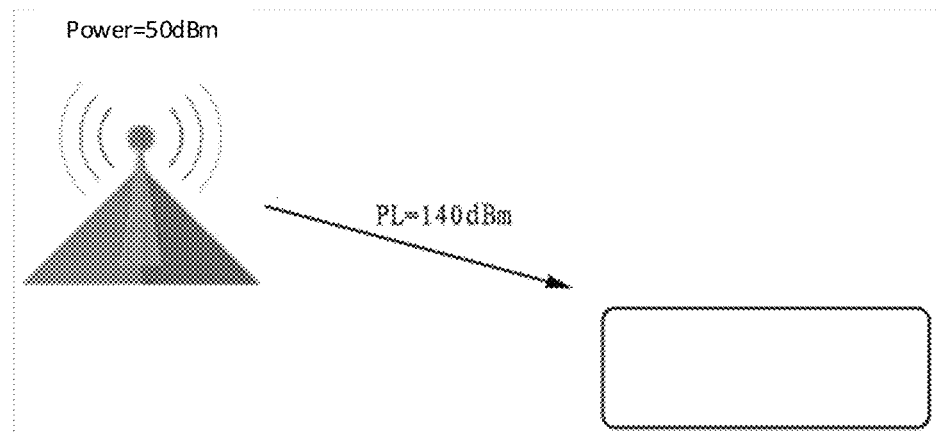
FIGS. 1A and 1B are schematic structural diagrams of base stations and terminal equipment with different cell coverage and PL.

In order to make the technical problems to be solved, technical schemes and beneficial effects by the present disclosure clearer, the present disclosure will be further described in detail below with reference to the accompanying drawings and embodiments. It should be understood that the specific embodiments described herein are merely intended to explain the disclosure and are not intended to limit the disclosure.

Before describing the embodiments of the present disclosure, the information elements mainly involved will be described in detail.

RACH-ConfigCommon-NB: this information element is configured to define the general parameters of a random access channel (RACH), and at least includes one of the following parameters (these parameters may also be referred to as information elements): preambleTransMax-CE, which indicates the maximum number of transmissions of preamble sequence; PowerRampingParameters, which includes powerRampingStep and preambleInitialReceivedTargetPower; and rach-InfoList, which includes a set of ra-ResponseWindowSize indicating random access response window size and mac-ContentionResolutionTimer.

It should be noted that in addition to one or more listed parameters, the RACH-ConfigCommon-NB may also contain other general parameters for defining random access.

NPRACH-ConfigSIB-NB: this information element is configured to define the configuration of the physical random access channel (PRACH) of the NB-IoT, for example, a narrow band physical random access channel (NPRACH). This information element includes at least one of the following parameters: nprach-CP-Length, which indicates the cyclic prefix length of NPRACH transmission; rsrp-ThresholdsPrachInfoList, which instructs the user equipment (UE) to select a NPRACH resource criteria; and nprach-ParametersList, which configures the NPRACH parameters for a group of NPRACH resources, respectively.

NPRACH-ParametersList: this information element configures the NPRACH parameters for a group of NPRACH resources, and at least includes one of the following parameters: nprach-Periodicity, which indicates the periods of NPRACH resources; nprach-StartTime, which indicates a start position of a NPRACH resource within one period; nprach-SubcarrierOffset, which indicates a frequency domain position of a NPRACH resource; nprach-NumSubcarriers, which indicates the number of subcarriers contained in one NPRACH resource; nprach-SubcarrierMSG3-Range Start, which is used to calculate the start subcarrier number reserved for the UE to indicate the NPRACH subcarrier supporting a multicarrier Msg3 transmission; maxNumPreambleAttemptCE, which indicates the maximum number of transmissions of preamble sequences on each NPRACH resource; numRepetitionsPerPreambleAttempt, which indicates the number of repetitions of sending preamble sequences on each NPRACH resource; npdcch-NumRepetitions-RA, which indicates a maximum number of repetitions of the common search space (CSS) of the NPDCCH related to RAR, Msg3 retransmission and Msg4; npdcch-StartSF-CSS-RA, which indicates a start subframe configuration of a common search space of a narrow physical downlink control channel (NPDCCH) related to RAR, Msg3 retransmission and Msg4; and npdcch-Offset-RA, which indicates a partial period offset of a start subframe of a common search space of the NPDCCH. It should be noted that in addition to one or more listed parameters, the NPRACH-ParametersList may also include other parameters used to configure the NPRACH but not directly included in the NPRACH-ConfigSIB-NB.

In related technologies, the process by which the NB-IoT determines the configuration resources of PRACH from system message 2 (SIB2) is roughly as follows: the rsrp-ThresholdsPrachInfoList determines the CEL, and selects the PRACH resource nprach-ParametersList corresponding to the determined CEL. The level of the CEL increases from 0, and the numRepetitionsPerPreambleAttempt increases accordingly.

In related technologies, when the RSRP of downlink signal measured by the NB-IoT falls into different segments configured by the network, the user equipment will select a corresponding CEL value (for example, a value from 0 to 3). Each CEL value corresponds to a set of RACH resource parameters, for example, numRepetitionsPerPreambleAttempt-r13 and npdcch-NumRepetitions-RA in Table 1 below. With the decrease of the signal RSRP, the values become larger. In this way, the success rate may be improved by increasing the number of repetitions.

TABLE 1

| RSRP Threshold value | CEL Value | NPRACH Configuration |
|---|---|---|
| RSRP >= −95 | 0 | numRepetitionsPerPreambleAttempt-r13 = n1<br>npdcch-NumRepetitions-RA-r13 = r1 |
| −105 =< RSRP < −95 | 1 | numRepetitionsPerPreambleAttempt-r13 = n4<br>npdcch-NumRepetitions-RA-r13 = r4 |
| −110 <= RSRP < −105 | 2 | numRepetitionsPerPreambleAttempt-r13 = n16<br>npdcch-NumRepetitions-RA-r13 = r16 |
| RSRP < −110 | 3 | numRepetitionsPerPreambleAttempt-r13 = n64<br>npdcch-NumRepetitions-RA-r13 = r64 |

The problem of this scheme is that if only the RSRP is used to measure the CEL value, it cannot accurately reflect the distance between the base station and UE. However, it reflects the path coupling loss of the uplink channel, it cannot reflect the signal quality of the downlink channel either. That is, the success rate of access will become low under the condition of high RSRP and high interference. The success rate of access depends more on reference signal receiving quality (RSRQ) and path loss (PL).

Figure 1B:
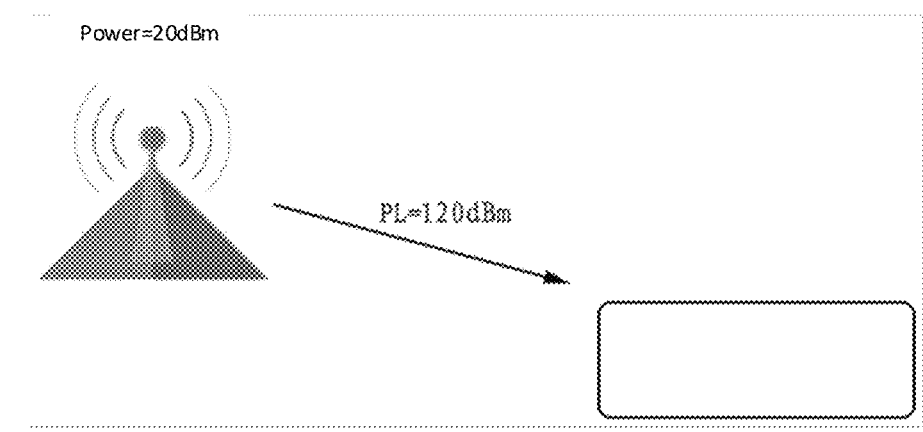

FIGS. 1A and 1B are schematic structural diagrams of base stations and a user equipment with different cell coverage and PL.

Referring to FIG. 1A. a base station A shown in FIG. 1A is a high-power and wide-coverage base station with a power of 50 dBm. When a user equipment A of NB-IoT is far away from the base station A, the PL from the base station A to the user equipment A of NB-IoT is 140 dBm. In this case, the RSRP of the user equipment A of NB-IoT is −90 dBm. From Table 1 above, it can be seen that the CEL value is 0, and the number of the uplink repetitions corresponding to the CEL value of 0 is selected as 1. However, due to insufficient number of repetitions, the uplink demodulation may fail, and thus the random access may fail.

Referring to FIG. 1B, a base station B shown in FIG. 1B is a low-power and low-coverage base station with a power of 20 dBm. When a user equipment B of NB-IoT is close to the base station B, the PL from the base station B to the user equipment B of NB-IoT is 120 dBm. In this case, the RSRP of the user equipment B of NB-IoT is −100 dBm. From Table 1 above, it can be seen that the CEL value is 1, and the number of uplink repetitions corresponding to the CEL value of 1 is selected as 4. In fact, because the user equipment B of NB-IoT is close to the base station B, one repetition is enough, and four repetitions will result in a waste of resources.

Figure 2:
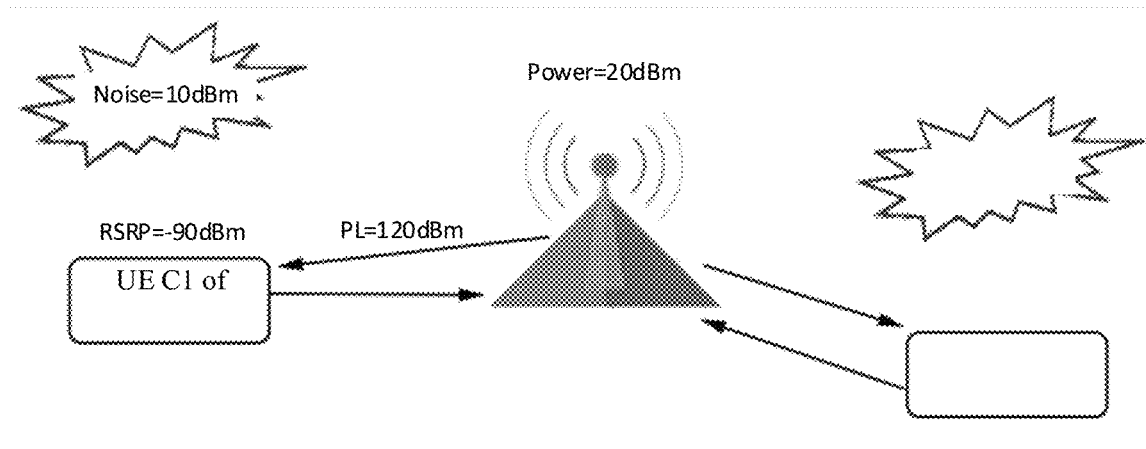
FIG. 2 is a schematic structural diagram of a base station and terminal equipment with co-channel interference.

FIG. 2 is a schematic structural diagram of a base station and a user equipment with co-channel interference.

Referring to FIG. 2, the power of a base station C shown in FIG. 2 is 20 dBm, and the PL from the base station C to a user equipment C1 of NB-IoT and the PL from the base station C to a user equipment C2 of NB-IoT are both 120 dBm, but the noise received by the user equipment C1 of NB-IoT is 10 dBm and the noise received by the user equipment C2 of NB-IoT is 3 dBm. In this case, the RSRP of user equipment C1 of NB-IoT is −90 dBm and the RSRP of the user equipment C2 of NB-IoT is −97 dBm. From Table 1 above, it can be seen that the CEL value of the user equipment C1 of NB-IoT is 0, and the number of uplink repetitions is 1; the CEL value of the user equipment C2 of NB-IoT is 1, and the number of uplink repetitions is 4. From the figure, it can be seen that the user equipment of NB-IoT are deployed in a wide range of locations, and the interference conditions of industrial or civil equipment are different from each other in different locations. Higher interference will lead to higher RSRP, but its actual signal quality is lower. If only RSRP is used to measure the CEL value, it will cause the user equipment to adopt a lower CEL value for the first time, that is, fewer repetitions are selected, thus reducing the success rate of the first access.

Figure 3:
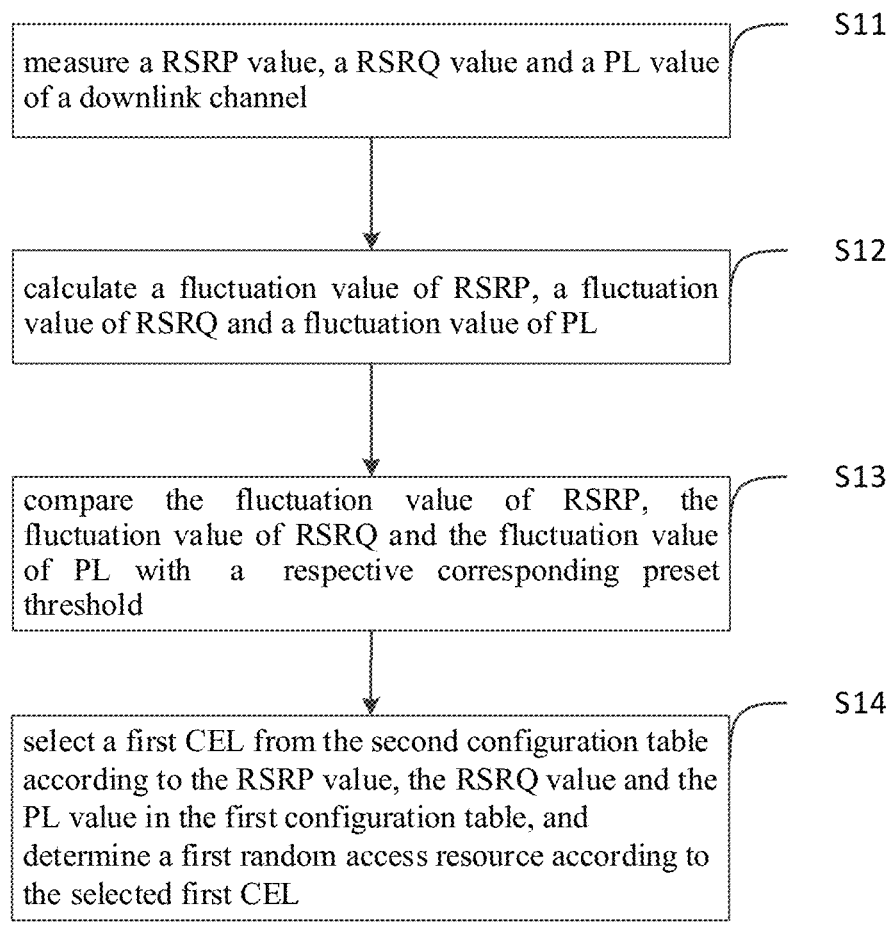
FIG. 3 is a flowchart of a method for selecting a random access resource according to an embodiment of the present disclosure.

FIG. 3 is a flowchart of a method for selecting a random access resource according to an embodiment of the present disclosure.

As shown in FIG. 3, the method for selecting a random access resource according to an embodiment of the present disclosure includes steps S11 to S14.

At step S11, an RSRP value, an RSRQ value and a PL value of a downlink channel are measured.

At step S12, a fluctuation value of RSRP, a fluctuation value of RSRQ and a fluctuation value of PL are calculated, according to the measured RSRP value, the measured RSRQ value, the measured PL value and an RSRP value, an RSRQ value, a PL value in a first configuration table.

In this embodiment, the first configuration table may store the configured RSRP value, RSRQ value and PL value on which random access has been successfully performed.

Table 2 shows the format of the first configuration table by way of example.

TABLE 2

| PL | RSRQ | RSRP | CEL |
|---|---|---|---|
| 120.5 | −3 | −90 | 0 |

As shown in the example in Table 2, PL=120.5, RSRQ=−3, RSRP=−90, and CEL value is 0, which may be the configured parameter value at the previous successful random access.

Assuming that the measured PL=134, RSRQ=−7 and RSRP=−95, then the fluctuation value of RSRP may be the absolute value of the difference between the PL value in Table 2 and the measured PL value, and the fluctuation value of RSRQ and the fluctuation value of PL are calculated in a similar way.

At step S13, the fluctuation value of RSRP, the fluctuation value of RSRQ and the fluctuation value of PL are compared with respective corresponding preset thresholds.

At step S14, in response to the fluctuation value of RSRP, the fluctuation value of RSRQ and the fluctuation value of PL not exceeding the corresponding preset thresholds, a first CEL is selected from the second configuration table according to the RSRP value, the RSRQ value and the PL value in the first configuration table, and a first random access resource is determined according to the selected first CEL.

In this embodiment, the preset thresholds may include a fluctuation threshold of RSRP, a fluctuation threshold of RSRQ and a fluctuation threshold of PL. If the fluctuation value of RSRP, the fluctuation value of RSRQ and the fluctuation value of PL calculated in step S12 do not exceed the respective corresponding preset thresholds (i.e., the fluctuation threshold of RSRP, the fluctuation threshold of RSRQ and the fluctuation threshold of PL), the CEL value may be selected by using the RSRP value, the RSRQ value and the PL value in the first configuration table.

Table 3 shows the fluctuation threshold of RSRP, the fluctuation threshold of RSRQ and the fluctuation threshold of PL by way of example.

TABLE 3

| PL fluctuation threshold | RSRQ fluctuation threshold | RSRP fluctuation threshold |
|---|---|---|
| 15 | 6 | 5 |

A first CEL and first random access resource corresponding to the first CEL may be determined in the second configuration table according to the RSRP value, the RSRQ value and the PL value in the first configuration table. The second configuration table may include a segmentation threshold configuration table and a mapping relation table of the CEL and NPRACH channel parameters.

Table 4 shows the segmentation threshold configuration table by way of example.

TABLE 4

| PL | RSRQ | RSRP | CEL |
|---|---|---|---|
| PL < 120 | RSRQ >= −5 | RSRP > −95 | 0 |
|  | RSRQ >= −5 | −95 <= RSRP < −105 | 0 |
|  | −5 < RSRQ < −10 | RSRP > −95 | 0 |
|  | −5 < RSRQ < −10 | −95 <= RSRP < −105 | 1 |
|  | RSRQ < −10 | −95 <= RSRP < −105 | 1 |
|  | RSRQ < −10 | −RSRP <= −105 | 2 |
| 120 < PL <= 150 | RSRQ >= −5 | RSRP > −95 | 0 |
|  | RSRQ >= −5 | −95 <= RSRP < −105 | 1 |
|  | −5 < RSRQ < −10 | RSRP > −95 | 1 |
|  | −5 < RSRQ < −10 | −95 <= RSRP < −105 | 2 |
|  | RSRQ < −10 | −95 <= RSRP < −105 | 2 |
|  | RSRQ < −10 | −RSRP <= −105 | 3 |
| PL > 150 | RSRQ >= −5 | RSRP > −95 | 1 |
|  | RSRQ >= −5 | −95 <= RSRP < −105 | 2 |
|  | −5 < RSRQ < −10 | RSRP > −95 | 2 |
|  | −5 < RSRQ < −10 | −95 <= RSRP < −105 | 3 |
|  | RSRQ < −10 | −95 <= RSRP < −105 | 3 |
|  | RSRQ < −10 | −RSRP <= −105 | 3 |

Table 5 shows the mapping relation table of the CEL and NPRACH channel parameters by way of example.

TABLE 5

| CEL | NPRACH configuration |
|---|---|
| 0 | numRepetitionsPerPreambleAttempt-r13 = n1<br>npdcch-NumRepetitions-RA-r13 = r1<br>. . . |
| 1 | numRepetitionsPerPreambleAttempt-r13 = n4<br>npdcch-NumRepetitions-RA-r13 = r4<br>. . . |
| 2 | numRepetitionsPerPreambleAttempt-r13 = n16<br>npdcch-NumRepetitions-RA-r13 = r16<br>. . . |
| 3 | numRepetitionsPerPreambleAttempt-r13 = r64<br>npdcch-NumRepetitions-RA-r13 = r64<br>. . . |

In the above example, the RSRP value, the RSRQ value and the PL value in the first configuration table are −90, −3 and 120.5 respectively (see Table 2). It may be determined from Table 4 that the corresponding first CEL value is 0, and it may be determined from Table 5 that the NPRACH channel parameters are numRepetitionsPerPreambleAttempt-r13=n1, npdcch-NumRepetitions-RA-r13=r1, etc. Then, random access may be initiated according to the determined NPRACH channel parameters.

It should be noted that Table 4 and Table 5 may be combined into one table, which is not limited by this disclosure.

Figure 4:
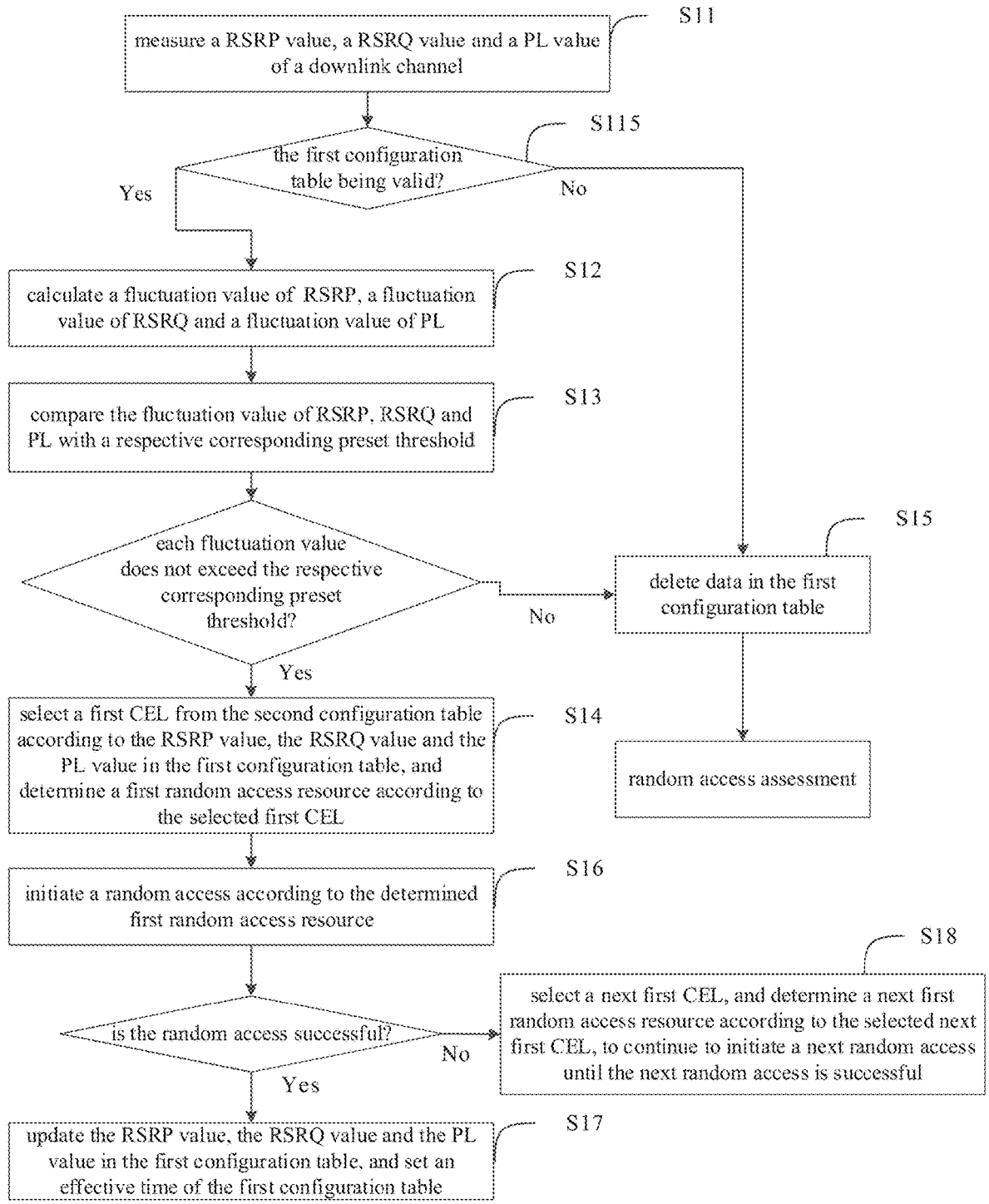
FIG. 4 is another flowchart of a method for selecting a random access resource according to an embodiment of the present disclosure.

FIG. 4 is another flowchart of a method for selecting a random access resource according to an embodiment of the present disclosure.

In the embodiment shown in FIG. 4, the method may further include step S115 before step S12, and the method may further include steps S15 to S18 after step S14.

At step S115, it is judged whether the first configuration table is valid; step S12 is executed in response to the first configuration table being valid, and step S15 is executed in response to the first configuration table being invalid.

At step S15, in response to one or more of the fluctuation value of RSRP, the fluctuation value of RSRQ and the fluctuation value of PL exceeding the corresponding preset thresholds, or in response to the first configuration table being invalid, the data in the first configuration table is deleted and a random access assessment is performed.

If one or more of the fluctuation value of RSRP, the fluctuation value of RSRQ and the fluctuation value of PL exceed the corresponding preset thresholds, the data in the first configuration table is invalid. In the embodiments of the present disclosure, the invalidity of the first configuration table includes at least two situations: first, a predetermined length of time has elapsed since the last update of the first configuration table, which may be determined by step S115; second, the measured RSRP value, RSRQ value and PL value are quite different from those in the first configuration table, which makes the first configuration table invalid.

At step S16, a random access is initiated according to the determined first random access resource.

At step S17, in response to a success of the random access, the RSRP value, the RSRQ value and the PL value in the first configuration table are updated according to the measured RSRP value, the measured RSRQ value and the measured PL value, and an effective time of the first configuration table is set.

At step S18, in response to a failure of the random access, a next first CEL is selected, and a next first random access resource is determined according to the selected next first CEL, so as to continue to initiate a next random access until the next random access is successful.

As an example, assume that the measured PL=134, RSRQ=−7, and RSRP=−95. The RSRP value, the RSRQ value and the PL value stored in the first configuration table are −90, −3 and 120.5 respectively (see Table 2). The fluctuation value of RSRP, the fluctuation value of RSRQ and the fluctuation value of PL are 5, 4 and 13.5 respectively, all of which do not exceed the corresponding preset thresholds (see Table 3). Therefore, the RSRP value, the RSRQ value and the PL value stored in the first configuration table, i.e. −90, −3, 120.5, may be directly used to determine through Table 4 and Table 5 that the first CEL is 0, and the corresponding NPRACH channel parameters are numRepetitionsPerPreambleAttempt-r13=n1, npdcch-NumRepeti-tions-RA-r13=R1, etc. Then, the random access may be initiated according to the NPRACH channel parameters (step S16).

The initiated random access process is monitored. If the random access is successful, the RSRP value, the RSRQ value and the PL value in the first configuration table are updated according to the measured RSRP value −95, RSRQ value −7 and PL value 134, and a timer is started to set an effective time of the first configuration table (step S17). The updated first configuration table is:

| PL | RSRQ | RSRP | CEL |
| --- | --- | --- | --- |
| 134 | −7 | −95 | 0 |

If the random access fails, a next first CEL is selected, and the next first random access resource is determined according to the selected next first CEL, so as to continue to initiate a next random access until the next random access is successful (step S18).

For example, next first CEL=1 may be selected, and the corresponding next first random access resource may be determined, that is, the NPRACH channel parameters are numRepetitionsPerPreambleAttempt-r13=n4, npdcch-Numrepetitions-RA-r13=r4, etc. Then, the next random access may continue to be initiated according to the NPRACH channel parameters until the next random access is successful. The updated first configuration table at this time is:

| PL | RSRQ | RSRP | CEL |
| --- | --- | --- | --- |
| 134 | −7 | −95 | 1 |

Similarly, a timer is started to set the effective time of the first configuration table.

Figure 5:
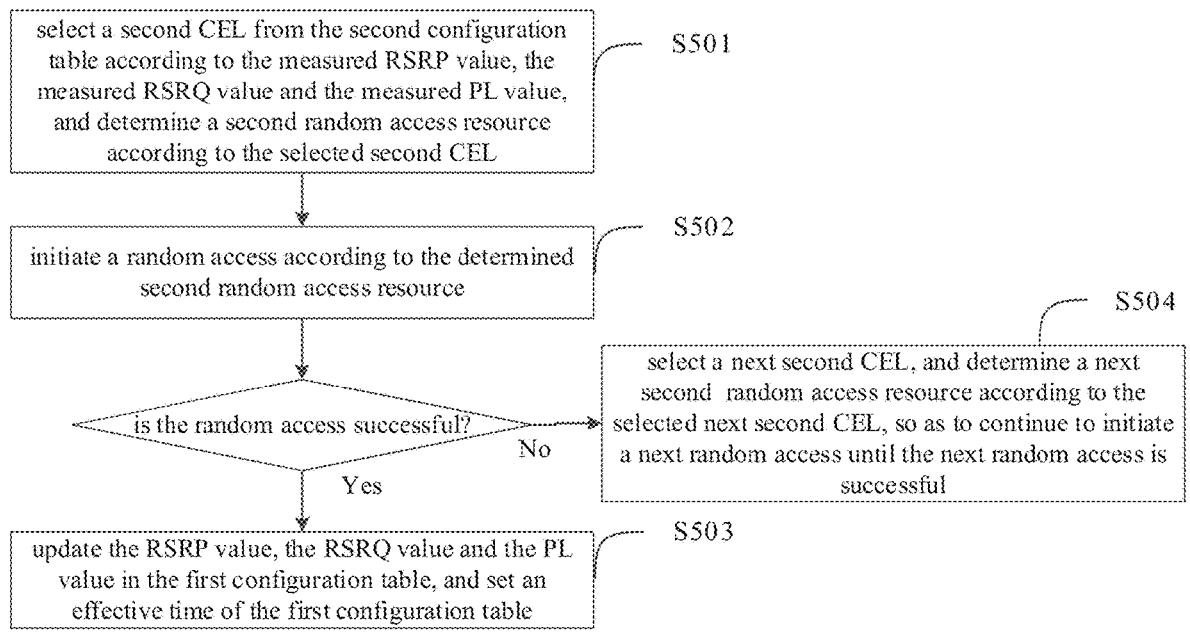
FIG. 5 is a flowchart of steps of performing a random access assessment according to an embodiment of the present disclosure.

FIG. 5 is a flowchart of steps of performing a random access assessment according to an embodiment of the present disclosure.

Referring to FIG. 5, the steps of performing the random access assessment may include steps S501 to S504.

At step S501, a second CEL is selected from the second configuration table according to the measured RSRP value, the measured RSRQ value and the measured PL value, and a second random access resource is determined according to the selected second CEL.

At step S502, the random access is initiated according to the determined second random access resource.

At step S503, in response to a success of the random access, the RSRP value, the RSRQ value and the PL value in the first configuration table are updated according to the measured RSRP value, the measured RSRQ value and the measured PL value, and an effective time of the first configuration table is set.

At step S504, in response to a failure of the random access, a next second CEL is selected, and a next second random access resource is determined according to the selected next second CEL, so as to continue to initiate a next random access until the next random access is successful.

The difference between step S501 and the above step S14 is that the CLE value and the corresponding random access resource are determined by using the measured RSRP value, RSRQ value and PL value instead of the RSRP value, RSRQ value and the PL value in the first configuration table. Steps S502 to S504 are substantially the same as the above steps S16 to S18, and will not be described in detail here.

In this mode, the random access assessment process is to select a second random access resource corresponding to the second CEL to initiate a random access by using the measured RSRP value, RSRQ value and PL value of the downlink channel.

According to the method for selecting a random access resource in the embodiments of the present disclosure, the CEL and corresponding random access resource may be selected through RSRP, RSRQ and PL to initiate a random access, which improves the success rate of the random access, reduces the consumption of resources and enhances the user experience.

Figure 6:
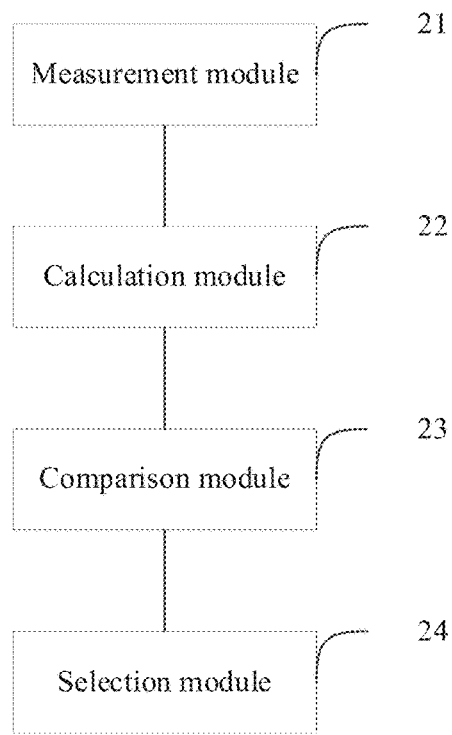
FIG. 6 is a schematic structural diagram of a device for selecting a random access resource according to an embodiment of the present disclosure.

FIG. 6 is a schematic structural diagram of a device for selecting a random access resource according to an embodiment of the present disclosure.

As shown in FIG. 6, the device for selecting a random access resource according to the embodiment of the present disclosure includes a measurement module 21, a calculation module 22, a comparison module 23 and a selection module 24.

Referring to FIGS. 3 and 6, the measurement module 21 is configured to measure an RSRP value, an RSRQ value and a PL value of a downlink channel (i.e., step S11 is executed). The calculation module 22 is configured to calculate a fluctuation value of RSRP, a fluctuation value of RSRQ and a fluctuation value of PL, according to the measured RSRP value, the measured RSRQ value, the measured PL value and an RSRP value, an RSRQ value, a PL value in a first configuration table (i.e., step S12 is executed). The comparison module 23 is configured to compare the fluctuation value of RSRP, the fluctuation value of RSRQ and the fluctuation value of PL with the respective corresponding preset thresholds (i.e., step S13 is executed). In response to the fluctuation value of RSRP, the fluctuation value of RSRQ and the fluctuation value of PL not exceeding the corresponding preset thresholds, the selection module 24 is configured to select a first coverage enhancement level (CEL) in a second configuration table according to the RSRP value, the RSRQ value and the PL value in the first configuration table, and determines a first random access resource according to the selected first CEL (i.e., step S14 is executed).

Figure 7:
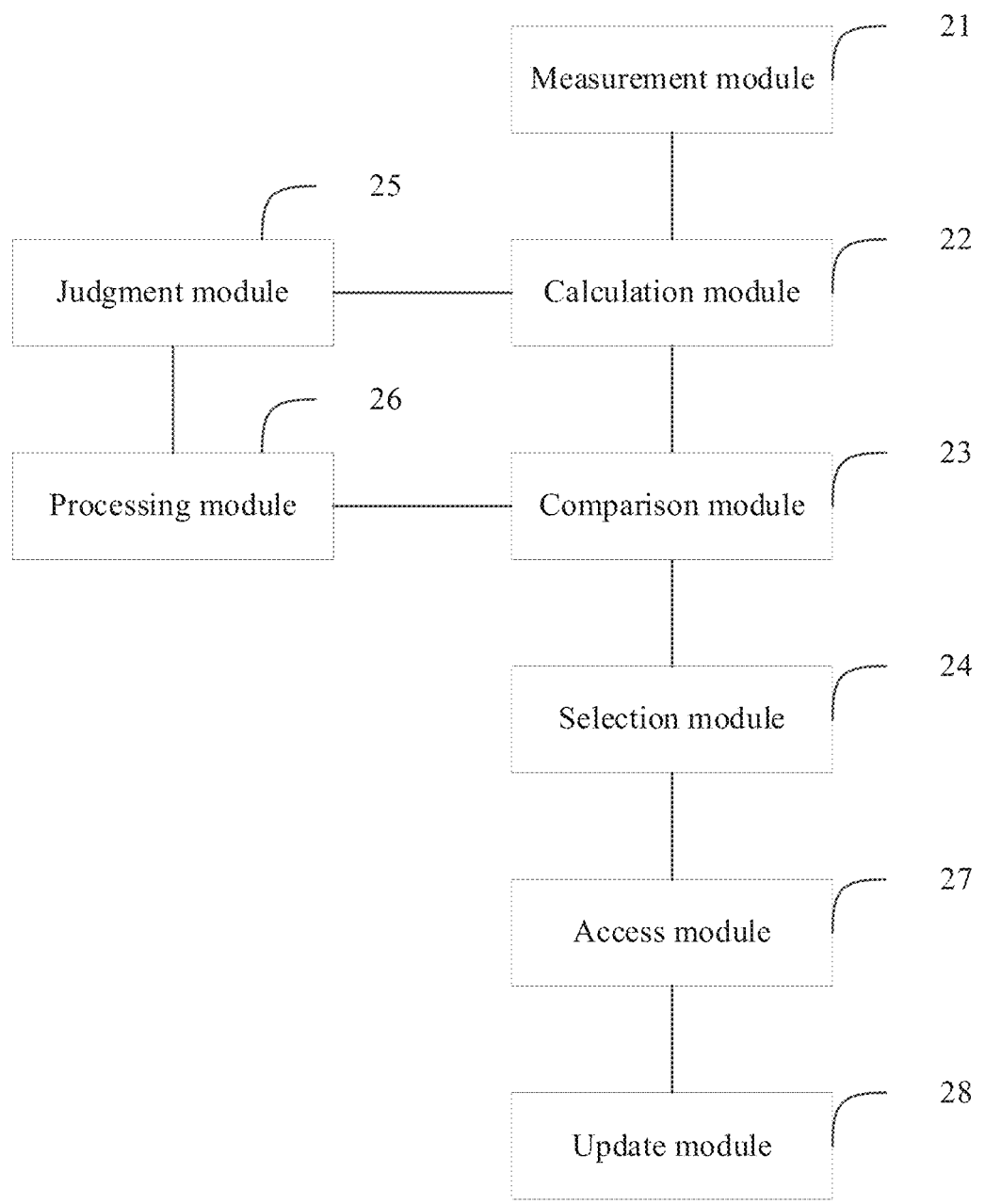
FIG. 7 is another schematic structural diagram of a device for selecting a random access resource according to an embodiment of the present disclosure.

FIG. 7 is another schematic structural diagram of a device for selecting a random access resource according to an embodiment of the present disclosure.

As shown in FIG. 7, the device for selecting a random access resource according to an embodiment of the present disclosure may further include a judgment module 25, a processing module 26, an access module 27 and an update module 28.

Referring to FIGS. 4 and 7, the judgment module 25 is configured to judge whether the first configuration table is valid (i.e., step S115 is executed). In response to the first configuration table being valid, the calculation module 22 is configured to calculate the fluctuation value of RSRP, the fluctuation value of RSRQ and the fluctuation value of PL (i.e., step S12 is executed). In response to the first configuration table being invalid, the processing module 26 is configured to delete the data in the first configuration table and performs a random access assessment (i.e., step S15 is executed).

In an embodiment, in response to one or more of the fluctuation value of RSRP, the fluctuation value of RSRQ and the fluctuation value of PL exceeding the corresponding preset thresholds, the processing module 26 is configured to delete the data in the first configuration table and performs the random access assessment (i.e., step S15 is executed).

The access module 27 is configured to initiate a random access according to the determined first random access resource (i.e., step S16 is executed). In response to a success of the random access, the update module 28 is configured to update the RSRP value, the RSRQ value and the PL value in the first configuration table according to the measured RSRP value, the measured RSRQ value and the measured PL value, and sets an effective time of the first configuration table (i.e., step S17 is executed). In response to a failure of the random access, the selection module 24 selects a next first CEL, and determines a next first random access resource according to the selected next first CEL to continue to initiate a next random access until the next random access is successful (i.e., step S18 is executed).

Referring to FIG. 5 and FIG. 7, in an embodiment, the steps of performing the random access assessment include: the selection module 24 selects a second CEL in the second configuration table according to the measured RSRP value, the measured RSRQ value and the measured PL value, and determines a second random access resource according to the selected second CEL (i.e., step S501 is executed); the access module 27 initiates a random access according to the determined second random access resource (i.e., step S502 is executed); in response to a success of the random access, the update module 28 updates the RSRP value, the RSRQ value and the PL value in the first configuration table according to the measured RSRP value, the measured RSRQ value and the measured PL value, and sets the effective time of the first configuration table (i.e., step S503 is executed); and in response to a failure of the random access, the selection module 24 selects a next second CEL, and determines a next second random access resource according to the selected next second CEL, so as to continue to initiate a next random access until the next random access is successful (i.e., step S504 is executed).

According to the device for selecting a random access resource in the embodiments of the present disclosure, a CEL and corresponding random access resource may be selected through an RSRP, RSRQ and PL, to initiate a random access, which improves the success rate of a random access, reduces the consumption of resources and enhances the user experience.

According to an embodiment of the disclosure, a device for selecting a random access resource is further provided, which includes a memory and a processor. A computer program is stored in the memory. When the computer program is executed by the processor, the processor performs the method for selecting a random access resource according to the embodiments of the present disclosure.

According to the device for selecting a random access resource in the embodiments of the present disclosure, a CEL and corresponding random access resource may be selected through RSRP, RSRQ and PL to initiate a random access, which improves the success rate of random access, reduces the consumption of resources and enhances the user experience.

According to embodiments of the present disclosure, there is further provided a non-transitory computer-readable storage medium storing a computer program which, when executed by a processor, causes the processor to perform the method for selecting a random access resource according to the embodiments of the present disclosure.

According to the non-transitory computer-readable storage medium in the embodiments of the present disclosure, a CEL and corresponding random access resource may be selected through RSRP, RSRQ and PL to initiate a random access, which improves the success rate of random access, reduces the consumption of resources and enhances the user experience.

It should be noted that the apparatus embodiments and the method embodiments above belong to the same concept, and the specific implementation process thereof is detailed in the method embodiment, and the description of the technical features in the method embodiment is applicable to the corresponding technical features in the apparatus embodiment, and details are not described herein again.

Meanwhile, those of ordinary skill in the art will appreciate that all or some steps of the above described method, functional modules/units in the system and apparatus may be implemented as software, firmware, hardware, and suitable combinations thereof. In a hardware implementation, the division between the functional modules/units mentioned in the above description does not necessarily correspond to the division of physical units; for example, a physical component may have multiple functions, or a function or step may be performed cooperatively by several physical components. Some or all components may be implemented as software executed by a processor, such as a digital signal processor or microprocessor, or implemented as hardware, or implemented as an integrated circuit, such as an application specific integrated circuit.

Preferred embodiments of the present disclosure have been described above with reference to the accompanying drawings, but they are not intended to limited the scope of the present disclosure. Without departing from the scope and nature of the present disclosure, a person skilled in the art may implement the present disclosure in different variations, such as the features in one embodiment may be used in another embodiment to obtain yet another embodiment. Any modifications, equivalent substitutions and improvements made within the technical concept of the present disclosure shall be within the scope of the appended claims of the present disclosure.

The invention claimed is:

1. A method for selecting a random access resource, comprising:
   measuring a reference signal receiving power (RSRP) value, a reference signal receiving quality (RSRQ) value and a path loss (PL) value of a downlink channel;
   calculating a fluctuation value of RSRP, a fluctuation value of RSRQ and a fluctuation value of PL, according to the measured RSRP value, the measured RSRQ value, the measured PL value and an RSRP value, an RSRQ value, a PL value in a first configuration table;
   comparing each of the fluctuation value of RSRP, the fluctuation value of RSRQ and the fluctuation value of PL with a respective corresponding preset threshold; and
   selecting a first coverage enhancement level (CEL) in a second configuration table according to the RSRP value, the RSRQ value and the PL value in the first configuration table, and determining a first random access resource according to the selected first CEL, in response to each of the fluctuation value of RSRP, the fluctuation value of RSRQ and the fluctuation value of PL not exceeding the respective corresponding preset threshold.

2. The method of claim 1, wherein before the step of calculating the fluctuation value of RSRP, the fluctuation value of RSRQ and the fluctuation value of PL, according to the measured RSRP value, the measured RSRQ value, the measured PL value and the RSRP value, the RSRQ value, the PL value in the first configuration table, the method further comprises:
   judging whether the first configuration table is valid;
   calculating the fluctuation value of RSRP, the fluctuation value of RSRQ and the fluctuation value of PL, in response to the first configuration table being valid; and
   deleting data in the first configuration table, and performing a random access assessment, in response to the first configuration table being invalid.

3. The method of claim 1, wherein after calculating the fluctuation value of RSRP, the fluctuation value of RSRQ and the fluctuation value of PL, the method further comprises:
   deleting data in the first configuration table, and performing a random access assessment, in response to at least one of the fluctuation value of RSRP, the fluctuation value of RSRQ and the fluctuation value of PL exceeding the respective corresponding preset threshold.

4. The method of claim 1, further comprising:
   initiating a random access according to the determined first random access resource;
   updating the RSRP value, the RSRQ value and the PL value in the first configuration table according to the measured RSRP value, the measured RSRQ value and the measured PL value, and setting an effective time of the first configuration table, in response to a success of the random access; and
   selecting a next first CEL, and determining a next first random access resource according to the selected next first CEL, in response to a failure of the random access, so as to continue to initiate a next random access until the next random access is successful.

5. The method of claim 2, wherein the step of performing the random access assessment comprises:
   selecting a second CEL in the second configuration table according to the measured RSRP value, the measured RSRQ value and the measured PL value, and determining a second random access resource according to the selected second CEL;
   initiating a random access according to the determined second random access resource;
   updating the RSRP value, the RSRQ value and the PL value in the first configuration table according to the measured RSRP value, the measured RSRQ value and the measured PL value, and setting an effective time of the first configuration table, in response to a success of the random access; and
   selecting a next second CEL, and determining a next second random access resource according to the selected next second CEL, in response to a failure of the random access, so as to continue to initiate a next random access until the next random access is successful.

6. The method of claim 3, wherein the step of performing the random access assessment comprises:
   selecting a second CEL in the second configuration table according to the measured RSRP value, the measured RSRQ value and the measured PL value, and determining a second random access resource according to the selected second CEL;
   initiating a random access according to the determined second random access resource;
   updating the RSRP value, the RSRQ value and the PL value in the first configuration table according to the measured RSRP value, the measured RSRQ value and the measured PL value, and setting an effective time of the first configuration table, in response to a success of the random access; and selecting a next second CEL, and determining a next second random access resource according to the selected next second CEL, in response to a failure of the random access, so as to continue to initiate a next random access until the next random access is successful.

7. A device for selecting a random access resource, comprising:
a measurement module configured to measure a reference signal receiving power (RSRP) value, a reference signal receiving quality (RSRQ) value and a path loss (PL) value of a downlink channel;
a calculation module configured to calculate a fluctuation value of RSRP, a fluctuation value of RSRQ and a fluctuation value of PL, according to the measured RSRP value, the measured RSRQ value, the measured PL value and an RSRP value, an RSRQ value, a PL value in a first configuration table;
a comparison module configured to compare each of the fluctuation value of RSRP, the fluctuation value of RSRQ and the fluctuation value of PL with a respective corresponding preset threshold; and
a selection module configured to select a first coverage enhancement level (CEL) in a second configuration table according to the RSRP value, the RSRQ value and the PL value in the first configuration table, and determine a first random access resource according to the selected first CEL, in response to each of the fluctuation value of RSRP, the fluctuation value of RSRQ and the fluctuation value of PL not exceeding the respective corresponding preset threshold.

8. The device of claim 7, further comprising a judgment module and a processing module, wherein
the judgment module is configured to judge whether the first configuration table is valid;
the calculation module is configured to calculate the fluctuation value of RSRP, the fluctuation value of RSRQ and the fluctuation value of PL, in response to the first configuration table being valid; and
the processing module is configured to delete data in the first configuration table, and perform a random access assessment, in response to the first configuration table being invalid.

9. The device of claim 8, wherein,
the processing module is configured to delete the data in the first configuration table, and perform a random access assessment, in response to at least one of the fluctuation value of RSRP, the fluctuation value of RSRQ and the fluctuation value of PL exceeding the respective corresponding preset threshold.

10. The device of claim 8, further comprising an access module and an update module, wherein,
the access module is configured to initiate a random access according to the determined first random access resource;
the update module is configured to update the RSRP value, the RSRQ value and the PL value in the first configuration table according to the measured RSRP value, the measured RSRQ value and the measured PL value, and set an effective time of the first configuration table, in response to a success of the random access; and
the selection module is configured to select a next first CEL, and determine a next first random access resource according to the selected next first CEL, so as to continue to initiate a next random access until the next random access is successful, in response to a failure of the random access.

11. The device of claim 10, wherein the random access assessment comprises steps of:
selecting, by the selection module, a second CEL in the second configuration table according to the measured RSRP value, the measured RSRQ value and the measured PL value, and determining a second random access resource according to the selected second CEL;
initiating, by the access module, a random access according to the determined second random access resource;
updating, by the update module, the RSRP value, the RSRQ value and the PL value in the first configuration table according to the measured RSRP value, the measured RSRQ value and the measured PL value, and setting an effective time of the first configuration table, in response to a success of the random access; and
selecting, by the selection module, a next second CEL, and determining a next second random access resource according to the selected next second CEL, so as to continue to initiate a next random access until the next random access is successful, in response to a failure of the random access.

12. An apparatus for selecting a random access resource, comprising a memory and a processor, wherein a computer program is stored in the memory, when the computer program is executed by the processor, the processor performs a method for selecting a random access resource comprising:
measuring a reference signal receiving power (RSRP) value, a reference signal receiving quality (RSRQ) value and a path loss (PL) value of a downlink channel;
calculating a fluctuation value of RSRP, a fluctuation value of RSRQ and a fluctuation value of PL, according to the measured RSRP value, the measured RSRQ value, the measured PL value and an RSRP value, an RSRQ value, a PL value in a first configuration table;
comparing each of the fluctuation value of RSRP, the fluctuation value of RSRQ and the fluctuation value of PL with a respective corresponding preset threshold; and
selecting a first coverage enhancement level (CEL) in a second configuration table according to the RSRP value, the RSRQ value and the PL value in the first configuration table, in response to each of the fluctuation value of RSRP, the fluctuation value of RSRQ and the fluctuation value of PL not exceeding the respective corresponding preset threshold, and determining a first random access resource according to the selected first CEL.

13. A non-transitory computer-readable storage medium storing a computer program which, when executed by a processor, causes the processor to perform a method for selecting a random access resource comprising:
measuring a reference signal receiving power (RSRP) value, a reference signal receiving quality (RSRQ) value and a path loss (PL) value of a downlink channel;
calculating a fluctuation value of RSRP, a fluctuation value of RSRQ and a fluctuation value of PL, according to the measured RSRP value, the measured RSRQ value, the measured PL value and an RSRP value, an RSRQ value, a PL value in a first configuration table;
comparing each of the fluctuation value of RSRP, the fluctuation value of RSRQ and the fluctuation value of PL with a respective corresponding preset threshold; and selecting a first coverage enhancement level (CEL) in a second configuration table according to the RSRP value, the RSRQ value and the PL value in the first configuration table, in response to each of the fluctuation value of RSRP, the fluctuation value of RSRQ and the fluctuation value of PL not exceeding the respective corresponding preset threshold, and determining a first random access resource according to the selected first CEL.

* * * * *